United States Patent [19]
Anderson

[11] 3,961,479
[45] June 8, 1976

[54] ENERGY CONVERTING HYDRAULIC BUOYANT MOTOR

[76] Inventor: Ray C. Anderson, 6655 S. New Haven, Tulsa, Okla. 74136

[22] Filed: Jan. 31, 1974

[21] Appl. No.: 425,945

Related U.S. Application Data

[63] Continuation-in-part of Ser. No. 407,523, Oct. 18, 1973.

[52] U.S. Cl. ............................................ 60/496
[51] Int. Cl.² ..................................... F03C 5/02
[58] Field of Search ............ 60/496, 495, 497, 502, 60/503, 498; 415/2, 7; 416/337

[56] References Cited
UNITED STATES PATENTS

| | | | |
|---|---|---|---|
| 291,340 | 1/1884 | Harvey | 60/503 |
| 1,403,702 | 1/1922 | Melvin | 60/496 |
| 1,885,866 | 11/1932 | Schiller | 60/503 |
| 2,470,312 | 5/1949 | Levin | 60/496 |
| 2,470,313 | 5/1949 | Levin | 60/496 |

FOREIGN PATENTS OR APPLICATIONS

| | | | |
|---|---|---|---|
| 121,925 | 6/1900 | Germany | 60/496 |

Primary Examiner—Martin P. Schwadron
Assistant Examiner—Harold Burks
Attorney, Agent, or Firm—Frank R. Thienpont

[57] ABSTRACT

A hydraulic motor for converting the potential energy of a reservoir of water into mechanical or electrical energy and utilizing a reciprocating free floating piston that can be cyclically drained and filled, or floated in a cylinder that can be drained and filled, and including automatically actuated valves to permit the draining and filling, and detention devices for restraining the piston from motion for a portion of its cycle.

37 Claims, 23 Drawing Figures

U.S. Patent    June 8, 1976    3,961,479
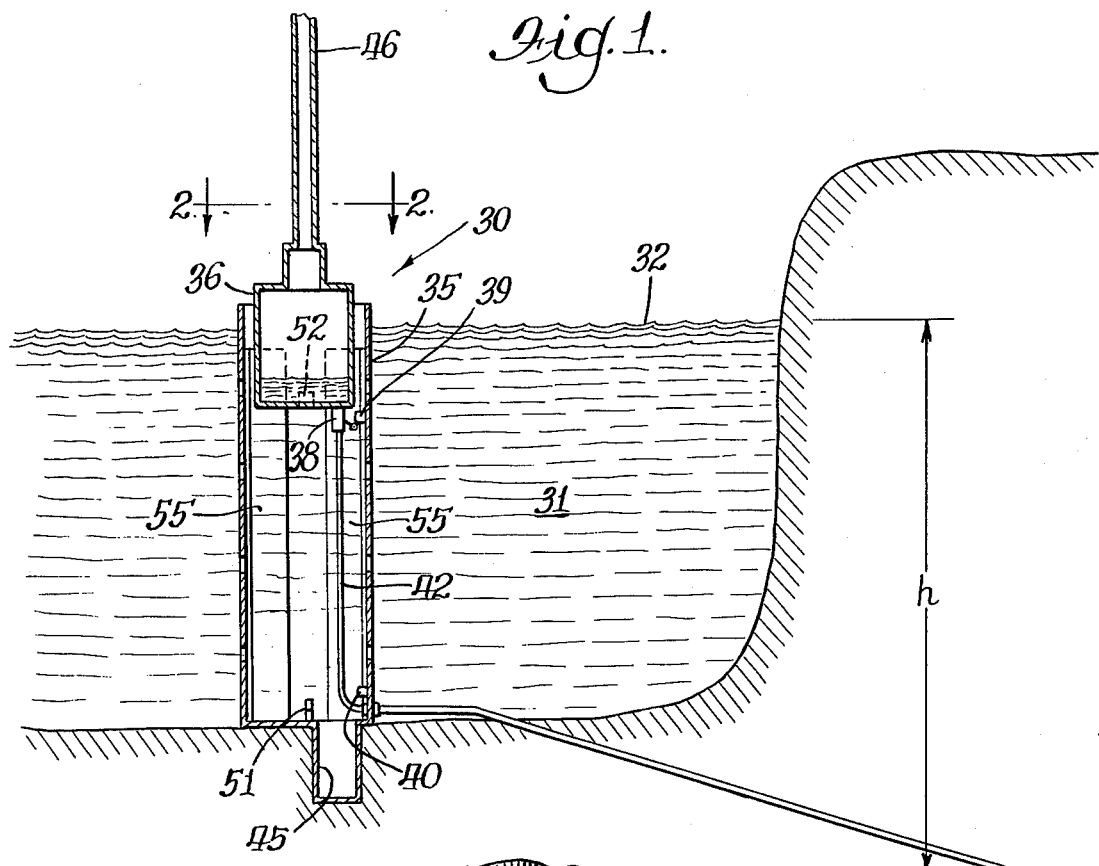
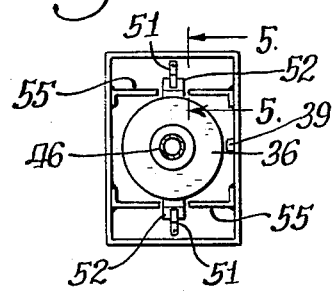
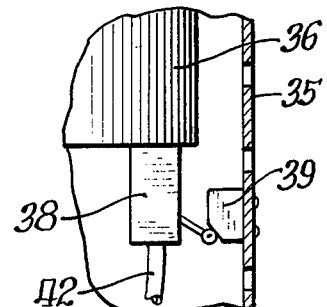
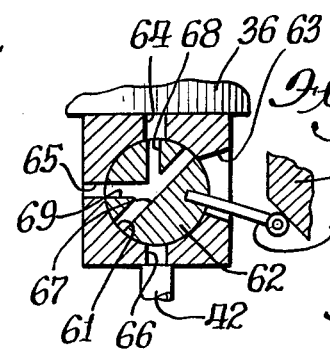
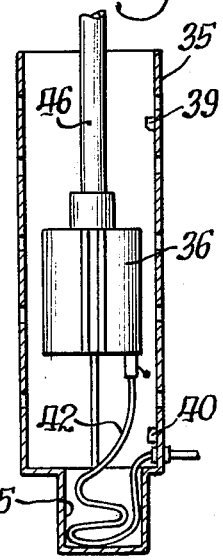
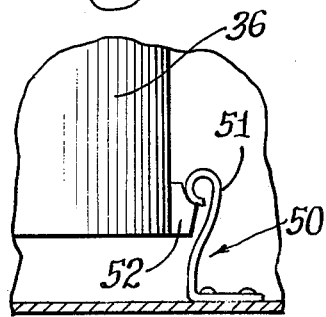
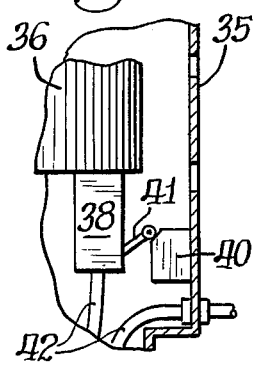
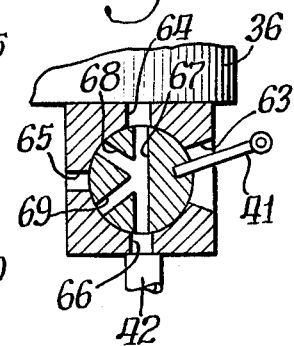

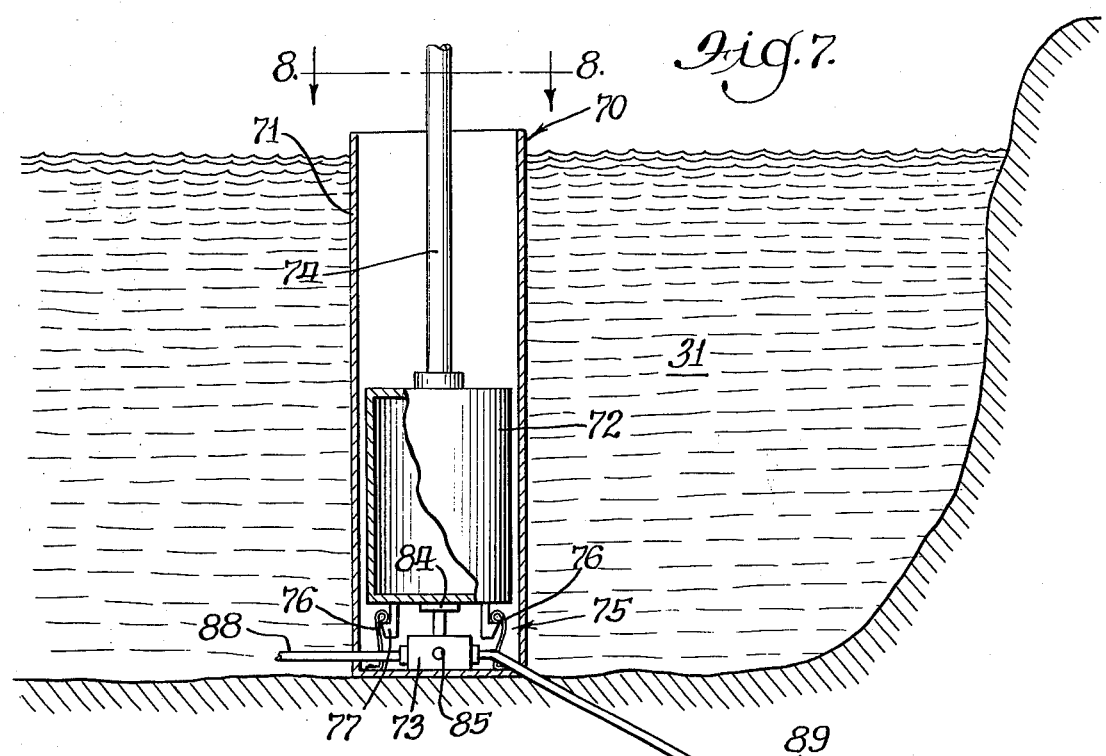
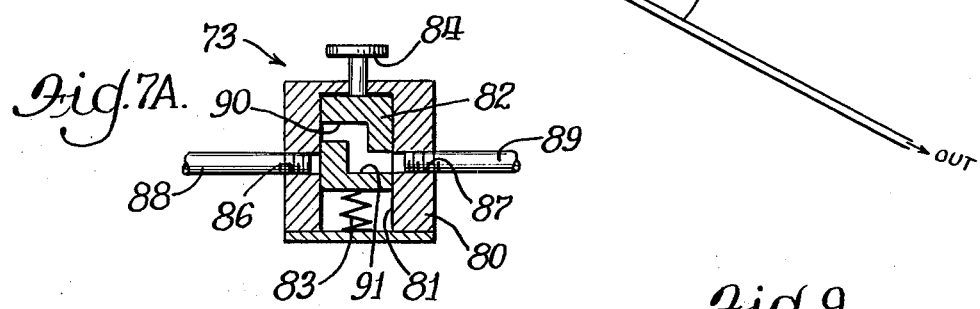
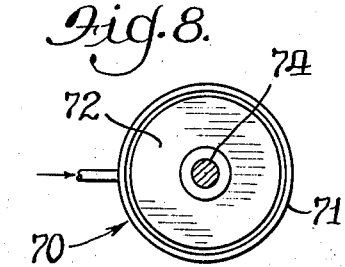
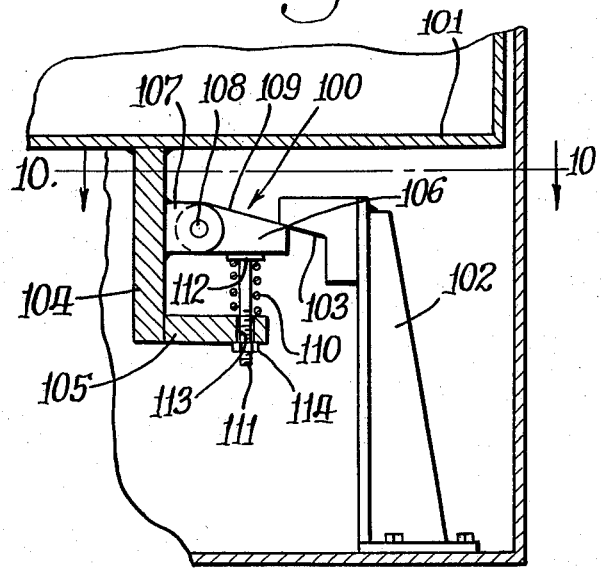
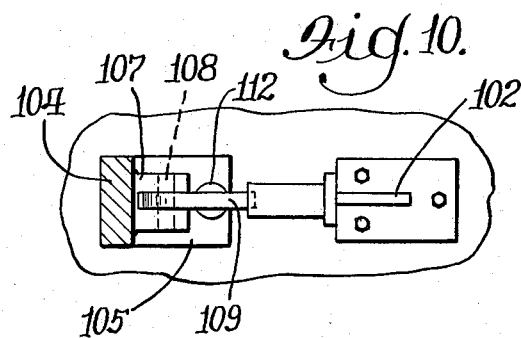

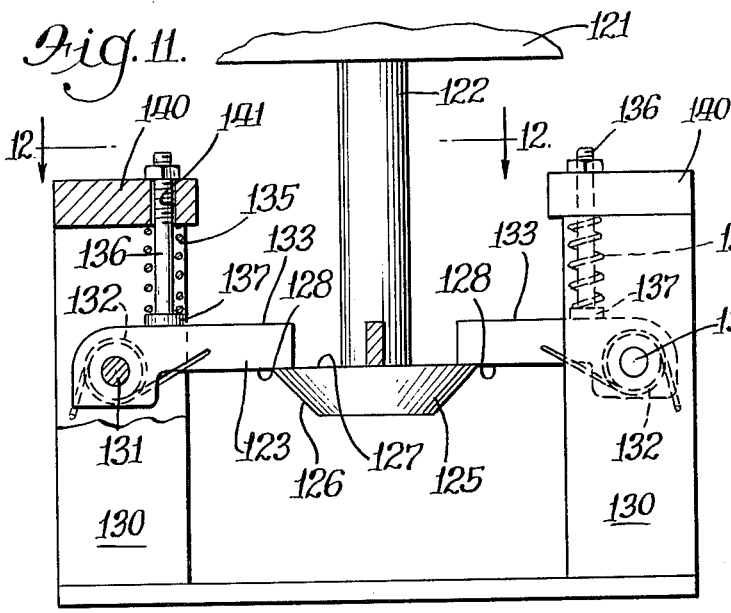
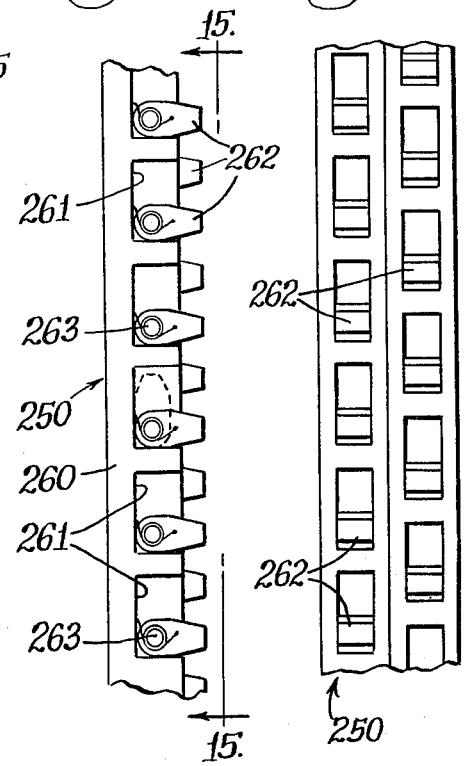
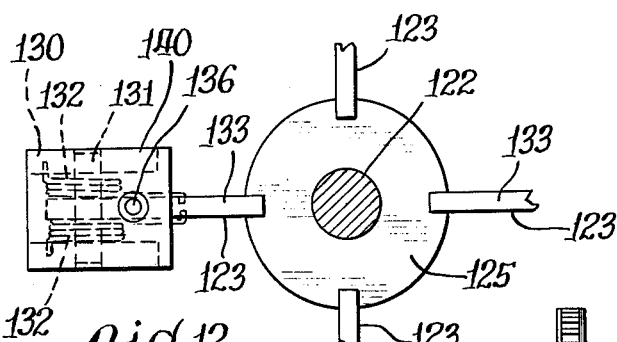
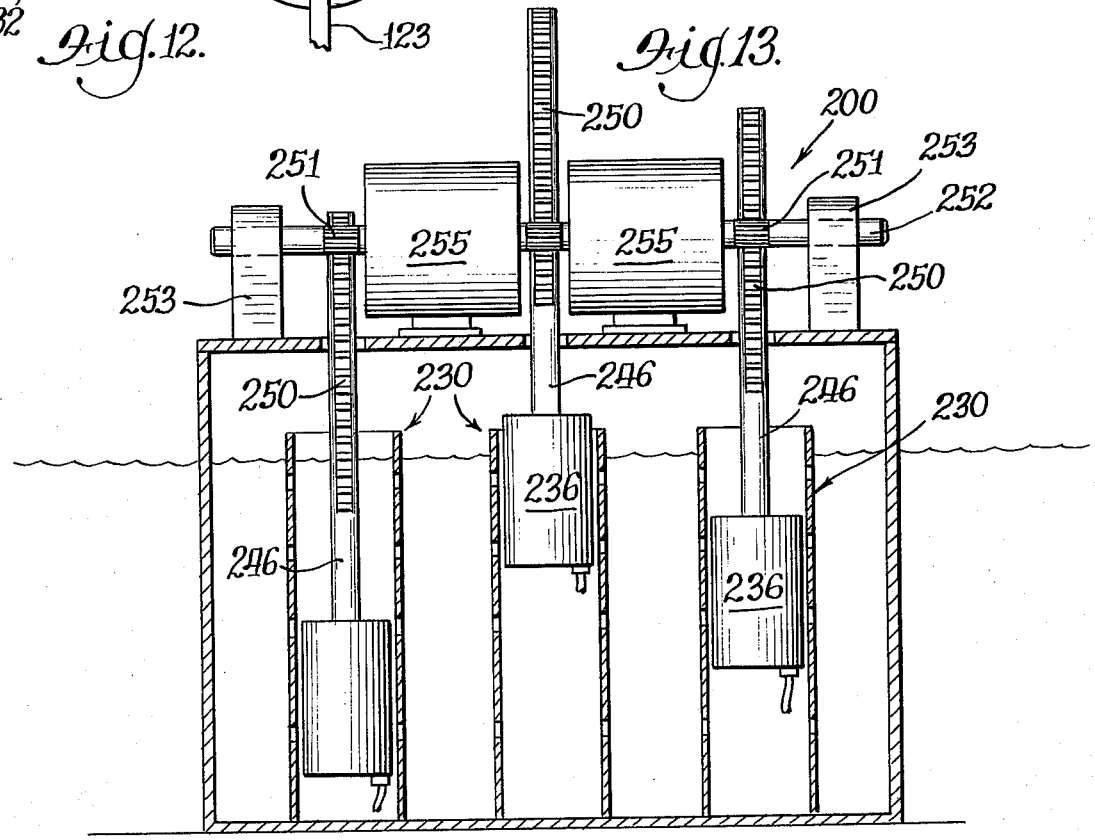

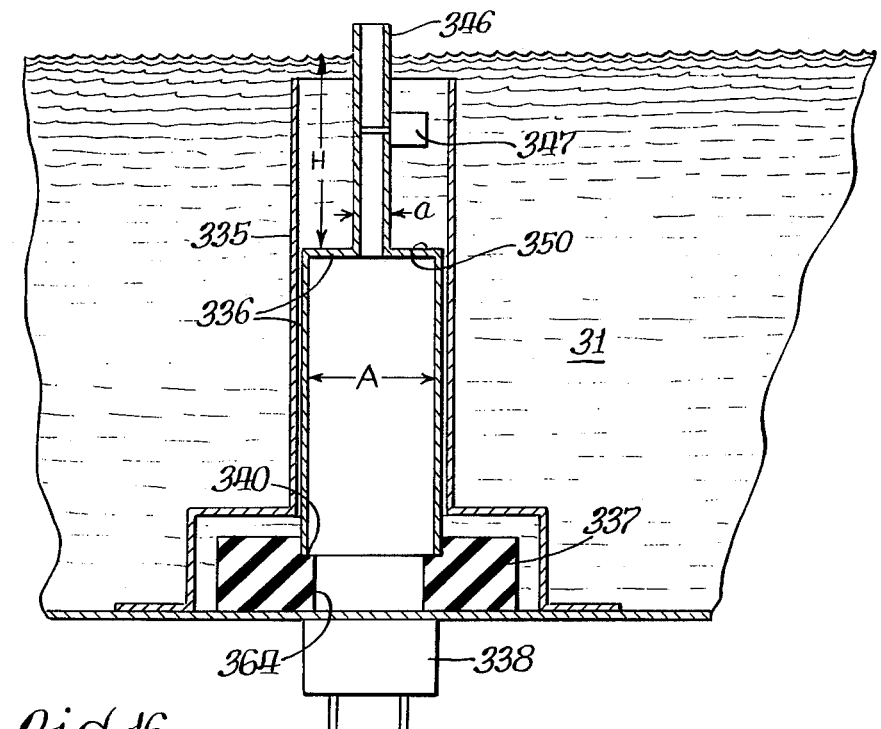
Fig. 16.
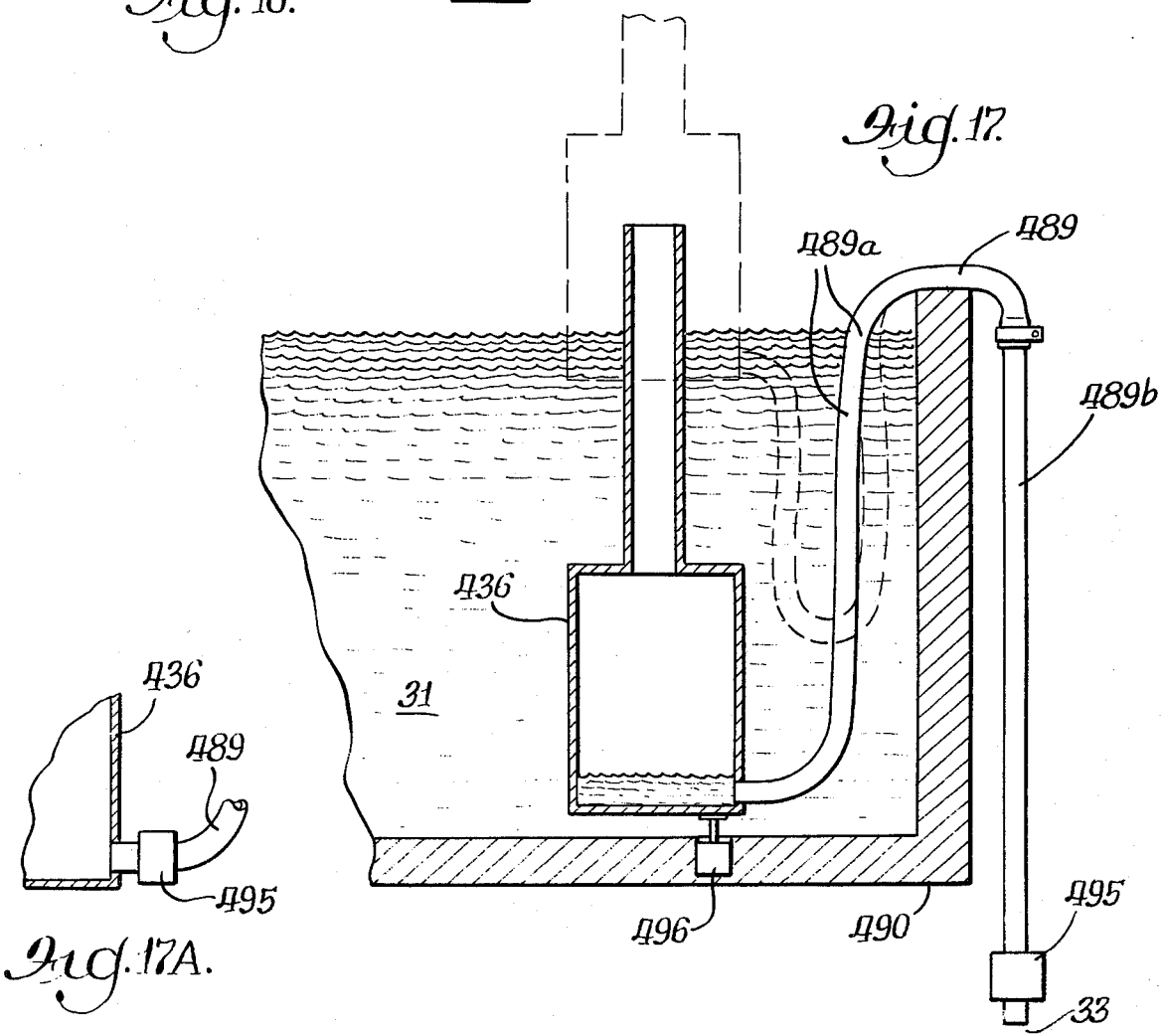
Fig. 17.
Fig. 17A.

ENERGY CONVERTING HYDRAULIC BUOYANT MOTOR

This is a continuation-in-part application of Ser. No. 407,523 filed on Oct. 18, 1973.

BACKGROUND OF THE INVENTION

The invention relates generally to power plants and more particularly to buoyancy type hydraulic motors for generating power.

Tidal motors and water power engines utilizing buoyant floats for converting a rise and fall of a water level into usable mechanical power are well known in the art. Examples of such motors are shown in the patent to Abraham, U.S. Pat. No. 1,570,421; the patent to Perkins, U.S. Pat. No. 1,627,996; and the patent to Martin, U.S. Pat. No. 3,485,038. For the most part, such motors are the equivalent of a boat entering a lock and being raised to a higher level by the flooding of the lock. No attempt is made to increase the thrust available due to the force of buoyancy acting on the float.

SUMMARY OF THE INVENTION

It is an object of the present invention to provide a hydraulic motor having a buoyant piston that is reciprocated due to the rise and fall of a water level and utilizes detention means to restrain the motion of the piston during a portion of its power stroke in order to increase the working force developed by the piston.

It is another object to provide a hydraulic motor of the type described including automatically actuated valves that are operated by the moving piston for draining and filling the piston, or for draining and filling a cylinder containing the piston.

It is a further object to provide a hydraulic motor including a bottomless buoyant piston having a vertical tubular extension attached to the top of said piston and incorporating a valve in said tubular extension to control the air moving into or out of the tubular extension and the piston.

It is still another object to provide a hydraulic motor having a buoyant piston which is completely sealed and is reciprocated in an enclosed tank responsive to the rise and fall of the water level in the tank.

It is still another object to provide a motor of the type described wherein the piston includes a vertical tubular extension open to the atmosphere, and wherein automatic piston detention is obtained by a differential fluid pressure acting on the top of the piston.

BRIEF DESCRIPTION OF THE DRAWINGS

FIG. 1 is a schematic overall illustration of the hydraulic buoyant motor of the present invention;

FIG. 2 is a top view taken on line 2—2 of FIG. 1;

FIG. 3 is an enlarged fragmentary view of a combined fluid inlet and release valve in its uppermost position;

FIG. 3A is an enlarged internal sectional view of the valve of FIG. 3;

FIG. 4 is a fragmentary view of the valve of FIG. 3 in its lowermost position;

FIG. 4A is an enlarged internal sectional view of the valve of FIG. 4 in the fluid release position;

FIG. 5 is an enlarged fragmentary view of the piston detention means;

FIG. 6 is a view showing the motor piston partially descended;

FIG. 7 is a schematic illustration of an alternate embodiment of the hydraulic motor of the present invention;

FIG. 7A is an enlarged internal sectional view of a combined fluid inlet and release valve;

FIG. 8 is a top view taken on line 8—8 of FIG. 7;

FIG. 9 is an enlarged fragmentary side view of a form of piston detention means;

FIG. 10 is a top view taken on line 10—10 of FIG. 9;

FIG. 11 is an enlarged side view of an alternate form of piston detention means;

FIG. 12 is a top view taken on line 12—12 of FIG. 11;

FIG. 13 is a schematic illustration of a multiple piston hydraulic motor employing the principles of the present invention;

FIG. 14 is an enlarged fragmentary side view of a portion of the hydraulic motor of FIG. 13;

FIG. 15 is a front view taken on line 15—15 of FIG. 14;

FIG. 16 is an illustration of a modified form of the buoyant motor FIG. 1;

FIG. 17 is a schematic illustration of a modified form of drain means that can be utilized with the invention; and FIG. 17A is a fragmentary view showing an alternate position for the drain valve.

DESCRIPTION OF THE PREFERRED EMBODIMENT

Figure 13A:
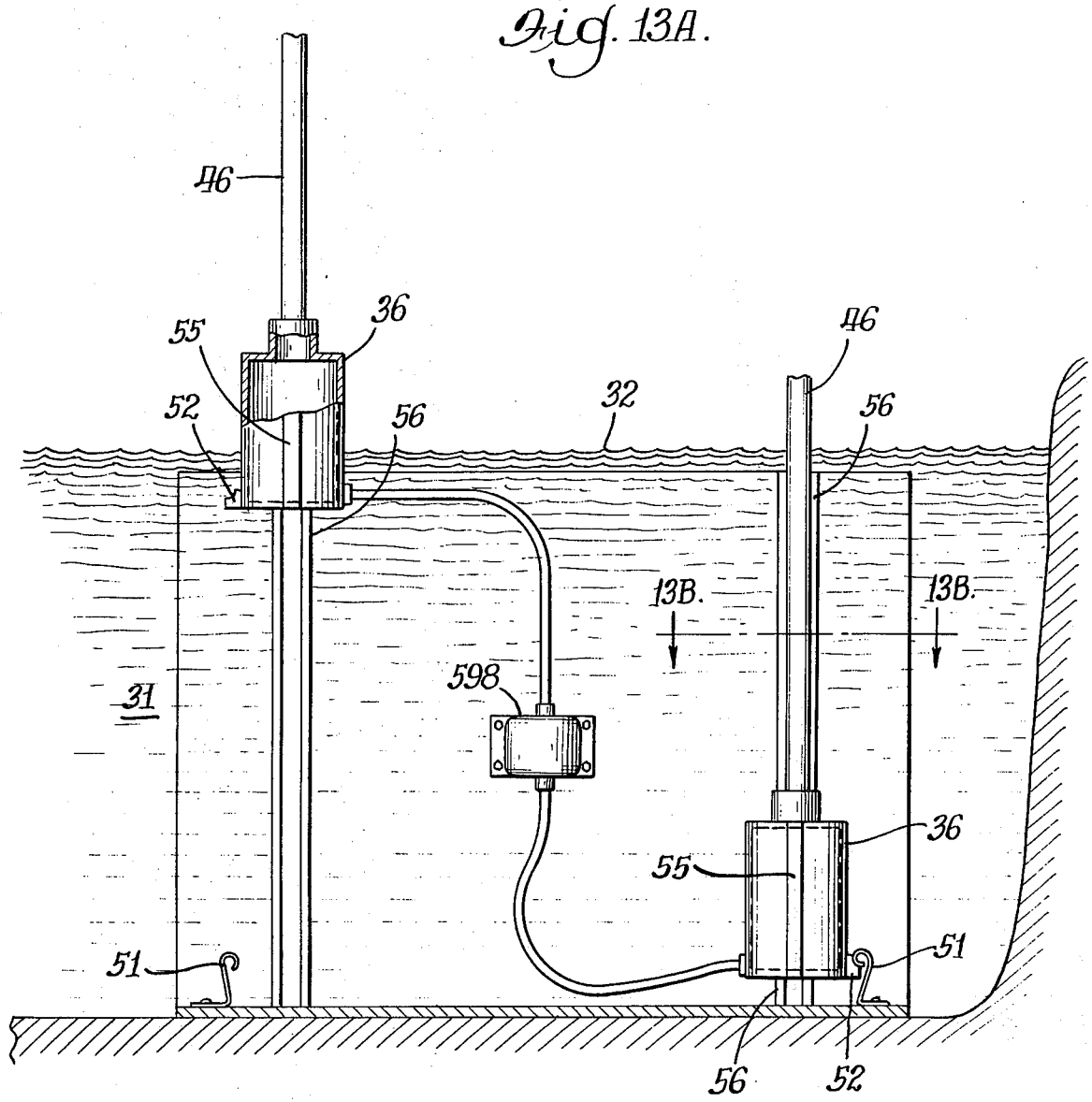
FIG. 13A is a schematic illustration showing pump means interconnecting two pistons of a multiple piston hydraulic motor.

The reciprocating buoyant motor of the present invention is designated generally by the numeral 30 and is illustrated in schematic form in FIG. 1. The motor 30 is shown as being immersed directly in a body of water 31 having a surface level 32. The motor 30 drains to some external lower level 33. It should be understood that the motor 30 might operate equally well externally of the body of water 31 so long as a static pressure head exists between the levels 32 and 33. This static fluid pressure head may be designated by $h$.

The motor 30 comprises an upright guide or perforated housing 35, a buoyant piston 36, and a combined fluid inlet and release valve 38 mounted on the underside of the piston 36. Two fixed valve actuating blocks 39 and 40 are mounted on the interior of the housing 35 for alternately operating the fluid inlet and fluid outlet portions of the valve 38. A valve actuating arm 41 for operating the valve 38 is mounted thereon and adapted to co-act with the actuating blocks 39 and 40. The interior of the housing 35 is constantly flooded with water from the body 31 being in open communication therewith through a plurality of openings 35a and the water level within is the same as 32 outside. The valve 38 is in communication with the interior of the piston 36 and is connected to the drain 33 by means of a flexible tube 42. A well 45 may be provided beneath the housing 35 for receiving the flexible tube 42 when the piston 36 descends, as shown in FIG. 6. The piston 36 is formed with an upright tubular extension 46 which is open to atmosphere and the opening is never submerged. This extension 46 may also serve as a power output shaft for the motor 30.

When the reciprocating piston 36 is in its lowermost position, as shown in FIGS. 4 and 5, detention means 50 are provided to restrain the piston 36 from rising. This detention means 50 is shown in FIG. 5 as a spring 51 co-acting with a detent block 52 mounted on the side of the piston 36. However, it should be understood that other detention means might be employed such as fluid pressure actuated pawls operable when the piston 36 is empty; or electrically operated or timed detention means might also be employed. For simplicity of description, the springs 51 will be assumed as the equivalent of such other detention means 50. FIG. 2 shows that a pair of such detention means 50 may be employed on opposite sides of the piston 36 to balance the restraining force. Guide rails 55 may also be provided on opposite sides of the piston 36.

A functional internal construction for the fluid inlet and release valve 38 may be as is shown in FIG. 3A. The valve 38 is shown in FIG. 3A in the fill or fluid inlet position, with the arm 41 in contact with the uppermost actuating block 39. The valve 38 comprises a solid body 60 formed with an internal cylindrical bore 61, and an arcuately movable valve cylinder 62 disposed within the bore 61. The actuating arm 41 is attached to the cylinder 62 through an opening 63 formed in the valve body 60. The valve body 60 is also formed with ports 64, 65, and 66, all of which open into the bore 61. The port 64 also opens into the interior of the piston 36, the port 65 is open to the water body 31, and the port 66 is connected to the drain tube 42.

The valve cylinder 62 is formed with a transverse diametrical bore 67 and two radial bores 68 and 69. In the position shown in FIG. 3A, the bores 68 and 69 provide a fluid passage between the ports 64 and 65. Water flows from the body 31 through the port 65, bore 69, bore 68, and port 64 into the interior of the piston 36. The port 66 is closed in this position by the valve cylinder 62.

In the uppermost position, the piston 36 fills with water and gradually sinks under its own weight to the bottom of the housing 35. The detent blocks 52 engage the springs 51 and the piston 36 is restrained in this lowermost position. In descending, the arm 41 contacts the block 40 and the valve cylinder 62 is turned to the position shown in FIG. 4A. In this latter position, the port 65 is blocked and the diametrical bore 67 provides a fluid passage between the ports 64 and 66. Water is drained from the piston 36 through the tube 42 to the drain outlet 33. In order to provide a faster drain, a pump may be incorporated in the drain system, for example, in the drain conduit 33a. As water is drained from the piston 36, the latter tends to rise according to Archimedes' principle, the force of buoyancy being equal to the weight of the fluid displaced by the piston 36. At some point, this buoyant force exceeds the combined forces of the weight of the piston 36 and the restraining force of the detention means 50. At this point, the piston 36 breaks free and rises to the water's surface. The piston 36 in rising is capable of doing work equal to the product of the net force of buoyancy times the distance the piston 36 rises. In rising, the arm 41 of the valve 38 contacts the block 39 and the valve cylinder 62 is moved to the fill position of FIG. 3A, and the cycle is repeated.

Referring now to FIG. 7, there is illustrated a modified form of the hydraulic buoyant motor of the present invention. This modified motor is designated generally by the numeral 70, and comprises an erect watertight cylinder 71, a sealed hollow piston 72 disposed to reciprocate vertically within the cylinder 71, and a combined fill and drain valve 73 mounted in the bottom of the cylinder 71. The diameter of the cylinder 71 need be only slightly larger than the diameter of the piston 72 so as to minimize the total amount of water used in filling and draining the cylinder 71 during each cycle of the piston 72. The cylinder 71 is shown as being immersed directly in a body of water 31 although the cylinder 71 could be mounted externally so long as the same relative fluid levels for operation are maintained.

A power output shaft 74 is mounted on top of the piston 72, and piston detention means 75 are provided on the underside of the piston 72. The detention means 75 shown are in the form of springs 76 co-acting with detent blocks 77. However, in this embodiment it may be desirable to provide pressure sensitive detention means responsive to the fluid pressure within the cylinder 71 so as to release the piston 72 when the cylinder 71 is full. Alternatively, it may also be desirable to provide timed detention means responsive to a predetermined or measured fill time so as to release the piston 72 when the cylinder 71 is full.

The combined fill and drain valve 73 may comprise a valve body 80 formed with a central bore 81, a valve piston 82 disposed to reciprocate within the bore 81, and a spring 83. The spring 83 urges the valve piston 82 toward the uppermost position, as shown in FIG. 7A, and a valve plunger 84 is mounted on top of the piston 82. The valve body 80 is formed with three ports 85, 86 and 87. The port 85 is always open to the water within the cylinder 71, and provides a fluid inlet and outlet opening for filling and draining the cylinder 71. The port 86 is connected by means of a fluid conduit 88 to the water body 31. The port 87 is connected to a drain conduit 89.

The valve piston 82 is formed with radial bores 90 and 91, and a longitudinal slot 92. The slot 92 connects the two bores 90 and 91 and in addition is always open to the port 85. In the position shown in FIG. 7A, the bore 91 is open to the drain port 87 thereby providing a fluid drain conduit from the port 85 through the slot 92, and bore 91 to the drain conduit 89 for draining the cylinder 71.

When the cylinder 71 drains, the piston 72 descends until it engages the detention means 75. At the same time, the weight of the piston 72 depresses the plunger 84 and brings the bore 90 of the valve 73 into communication with the fluid inlet port 86 thereby providing a fluid inlet path for filling the cylinder 71. Water flows from the conduit 88 through the port 86, bore 90, slot 92 and port 85 into the cylinder 71. At some point, the detention means 75 releases and the piston 72 rises to the surface of the water within the cylinder 71. Again, the piston 72 is capable of doing work equal to the product of the net force of buoyancy times the distance the piston 72 rises. Since the piston 72 can displace a weight of liquid only equal to its own volume, it may be preferable to use timed detention means, or a pressure sensitive release means responsive to the fluid pressure within the cylinder 71.

When the piston 72 is released by the detention means 75, the spring 83 forces the valve piston 82 upward blocking the fluid inlet port 86 and opening the drain port 87. The cylinder 71 is thus drained again and the cycle is repeated.

Referring to FIGS. 9 and 10, there is illustrated a type of spring detention means 100 that might be used advantageously to restrain the upward motion of a piston 101. The detention means 100 comprises a fixed anchor member 102 formed with an angled contact surface 103, a depending mounting bracket 104, a rigid ledge 105 attached to the bracket 104, and a pivoted contact arm 106. The arm 106 is pivotally mounted on a slotted anchor 107 by means of a pin 108. The arm 106 is formed with an angled upper contact surface 109 adapted to engage the fixed contact surface 103. A compression spring 110 is mounted on the ledge 105 and forms a lost motion connection with the pivot arm 106. The spring 110 is held in place under compression by a bolt 111 and retaining cap 112. The bolt 111 extends loosely through a hole 113 bored through the ledge 105. A nut 114 attached to the bolt 111 limits the upward extension of the retaining cap 112 which engages the head of the bolt 111 and the spring 110.

When the piston 101 descends, the bottom of the arm 106 contacts the top of the anchor 102 and the arm 106 swings up away from the spring 110. After the arm 106 clears the top of the anchor 102, it falls into place in contact with the top of the spring 110. As the piston 101 tends to rise under the force of buoyancy, the surface 109 of the arm 106 engages the surface 103 and restrains the piston 101 from rising further. At some point, the force of buoyancy exceeds the force of compression of the spring 110 and the arm 106 slips past the contact surface 103. The piston 101 then rises to perform its working stroke.

Referring now to FIGS. 11 and 12, there is illustrated still another form of spring detention means 120 for a piston 121. The detention means 120 comprises a central rod 122 depending from and rigidly attached to the piston 121, and a plurality of pivoted restraining arms 123. The rod 122 is formed with an enlarged conical head 125 having a conical lower surface 126 and an upper latching surface 127. The upper surface 127 is adapted to engage the lower contact surfaces 128 of the arms 123. Each of the arms 123 is pivotally mounted on a fixed upright support 130 by means of a pin 131. Torsion springs 132 surround the pin 131 engaging the support 130 and the arms 123 tending to bias the arms 123 in an upward direction. The upper surfaces 133 of each of the arms 123 makes a lost motion connection with a compression spring 135. The spring 135 is retained under compression by means of a bolt 136 and a retaining cap 137. The spring 135 is mounted on the underside of an upper ledge 140 of the support 130 with the free end of the bolt 136 extending loosely through a hole 141 drilled through the ledge 140. A nut 142 on the free end of the bolt 136 holds the bolt 136 and spring 135 in place and rises away from the upper surface of the ledge 140 when the spring 135 is compressed by the action of the rod 122.

When the piston 121 descends, the conical head 125 contacts the upper edges of the surfaces 133 forcing the arms 123 downward against the action of the torsion springs 132. After the downward travel of the head 125 clears the arms 123, the arms 123 swing upward into the position shown in FIG. 11 under the action of the torsion springs 132. The springs 135 limit the upward travel of the arms 123 and stop them in the position shown. As the force of buoyancy on the piston 121 increases, the piston 121 rises and the upper surface 127 of the head 125 engages the surface 128 of the arms 123. The piston 121 is then restrained in this position until the force of buoyancy exceeds the combined force of compression of the springs 135. At this point, the head 125 breaks free from the arms 123 and the piston 121 rises to perform its working stroke.

Figure 13B:
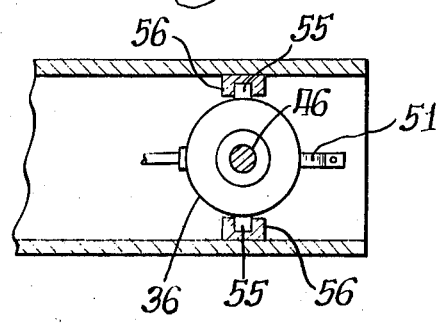
FIG. 13B is a top view taken along line 13B—13B of FIG. 13A.

FIG. 13 illustrates in schematic form a power generator 200 wherein a plurality of buoyant motors of the types described might be employed to provide a continuous output of power. The generator 200 comprises a plurality of separate buoyant motors 230 each having a reciprocating piston 236 and a power output shaft 246. Each of the output shafts 246 carries a rack 250 adapted to engage respective pinion gears 251 formed on a transversely mounted rotatable output shaft 252. The shaft 252 is journalled in upright supports 253 mounted on a supporting stand 254. The rotatable shaft 252 is connected to drive a generator 255 or other suitable rotating machinery for converting the potential energy of the water pressure head into electrical or other usable form of energy.

FIGS. 14 and 15 show two views of a type of rack 250 that might be used to advantage in the generator 200. Each of the racks 250 comprises a linear body 260 formed with a plurality of rectangular openings 261 and a pivoted tooth 262 mounted in each of the openings 261. Each tooth 262 is pivotally mounted on a pin 263 and may be biased toward an outward position by a bias spring 264. The tooth 262 abuts against a stop 265 forming one wall of the opening 261 to provide a reaction point for making a driving connection between the rack 250 and the pinion gear 251.

When the piston 236 rises during its driving stroke, the teeth 262 are biased outwardly and engage the pinion 251. The force of the buoyant piston 236 imparts a driving torque to the shaft 252 through the pinion gear 251. When the piston 236 sinks or retracts, the teeth 262 in contact with the pinion gear 251 are caused to retract into the openings 261 against the action of the torsion springs 264. The rack 250 therefore imparts rotation to the shaft 252 in only one direction. Two sets of gear teeth 262 may be provided as shown in FIG. 15 to ensure that one engaging tooth 262 is provided for each tooth on the corresponding pinion gear 251.

It should be noted that precise synchronism of operation of the separate motors 230 is not required, although reasonable synchronism is desired to ensure a balanced or steady output of power. The separate motors 236 are capable of operation automatically and continuously so long as a fluid pressure head is maintained.

It should also be noted that no mention has been made of the size or dimensions of the components used in the invention. It is desirable that the ports and openings in the valve be as large as feasible to ensure rapid filling and emptying of the pistons or cylinders. It is also desirable to have as long a working stroke as possible for an available pressure head. However, it is possible to operate the motor of the present invention with larger pistons and shorter strokes depending on the volume of working fluid available.

To further assure rapid filling and emptying of the pistons 236 there may be incorporated in the system, pump means 598 connected between an adjacent pair of pistons, one of which is normally positioned at the beginning of its power stroke while the other is at the end of its power stroke. This is illustrated in FIG. 13A. One advantage of this arrangement is that faster filling and draining of the respective pistons can be accomplished than by merely allowing the piston to be filled by the surrounding water or drained by gravity thus allowing faster oscillation of the pistons. Another advantage is that there need be substantially no loss of water because instead of disposing of the water by draining it to a lower level the water is in effect "drained" to another piston.

Furthermore, it should be noted that in an application where but a single buoyant hollow piston is used it is possible to provide a pump connected by conduits between the piston and a tank whereby water from the tank may be pumped from the tank to the piston to sink the piston. Then the pump may be operated to drain the water from the piston and send it back to the tank, thus using the same water over and over again. Appropriate valving may be incorporated at the piston and tank whereby alternate filling of the piston from the tank and draining of the piston to the tank may be accomplished.

When pump means is employed in connection with the filling and draining of one or more pistons, pump actuating means may be provided which is responsive to the position of the piston. For example, electrical switch means for reversing the direction of pumping by the pump means may be actuated by the movement of the piston to different positions as illustrated in FIG. 1.

In an ocean or large lake environment a general arrangement as shown in FIG. 13 incorporating buoyant sealed piston units as illustrated in FIG. 7 might be used. In such an environment it might be possible to use the force of consecutive waves to cause the rapid intermittent rise and fall of the pistons. The power stroke could be in either direction. In such a case detention means would not be used since it would be desirable to accomplish as much cycling of the buoyant pistons as possible.

The modified form of buoyant motor 330 illustrated in FIG. 16 might be employed where very rapid filling and draining of the piston 336 is desired or required. The motor 330 comprises the bottomless piston 336, a cylindrical guide 335 for the piston 336, a large diameter cylindrical fluid seal 337 at the bottom of the guide 335, and a large capacity fluid release valve 338. The piston 336 includes an integral tubular extension 346 extending above the surface of the water, and an air sealing valve 347 mounted on the extension 346 and adapted to close off the passage of air therethrough. The seal 337 may be formed with an annular ledge 340 and a large diameter central opening 364. The ledge 340 serves as a valve seat and cooperates with the lower edge 341 of the piston 336 to form a fluid tight seal when the piston 336 falls to the bottom of its stroke. The cylindrical opening 364 is in communication with the drain valve 338.

In operation, the motor 330 functions as follows: In the position shown in FIG. 16, the lower edge 341 of the piston 336 is sealed against the seal 337, and both valves 338 and 347 are open allowing water to drain from the piston 336 through the valve 338. Air enters through the tube 346 and valve 347 to replace the water drained away. At some point, the piston 336 breaks away from the seal 337, the valves 347 and 338 are closed and the piston 336 rises to the surface to perform its power stroke.

When the piston 336 reaches the surface, the valve 347 is opened allowing air to escape from the air pocket formed in the interior of the piston 336. The piston 336 then fills with water and sinks to the bottom seating against the seal 337. The valve 338 is then opened, draining the water from the interior of the piston, and the cycle is repeated.

It should be noted that this design of motor 330 provides its own detention means for the piston 336 during the draining process. The piston 336 has a cross-sectional area "A", and the tubular extension has a cross-sectional area $a$. The top 350 of the piston 336 has an area equal to difference between these two "B". Whenever the water level within the piston 336 falls below the top 350, there is a holding force applied to the piston 336 equal to the weight of a column of water directly above B. The magnitude of this detention force is directly proportional to the height "H" of this column. The net force of buoyancy acting on the piston 336 is equal to the weight of the water displaced minus the weight of the piston 336 and its tubular extension 346 and valve 347. As the draining of the interior of the piston 336 continues, at some point the force of buoyancy exceeds the combined forced of the weight of piston 336 and the weight of the column of water above the top 350. At this point, the piston 336 breaks away and rises to the surface.

Additional detention means such, for example, as of the various types already described herein may be operatively associated with the piston 336, however, to further restrain the piston 336 and release it as desired.

The operation of the valves 338 and 347 should be timed or pressure responsive so as to act in unison with the motion of the piston 336.

In order to eliminate the need for drilling or tunnelling to provide a point of lower elevation for the drain 33, the modified form of drain line illustrated in FIG. 17 might be employed. In this illustration, a drain line 489 having a flexible portion 489a is connected to the bottom of the piston 436 and extends over a dam or weir 490 to line 489b which is an extension of 489a and discharges at the drain level 33. The drain line 489 is primed with water at all times and acts as a siphon for conveying the water from the piston 436 to the drain outlet 33. A valve 495, which may be electrically operated, may be connected into the line 489 for controlling the discharge of water therefrom according to the position of the piston 436. A plunger actuated switch 496 can be provided beneath the piston 436 for energizing the valve 495 when the piston 436 is at its lowermost position. The piston 436 can be filled by any means heretofore described and any of the previously described detention means can also be employed.

The valve 495 can be positioned in the line 489 at any level that lies below the lowest level reached by water within the piston 436 in order to maintain suction in the line 489. If the discharge end of the line 489 is maintained under water, so that the line cannot lose suction, the valve 495 may also be positioned directly on the outlet of the piston 436, as shown in the fragmentary view FIG. 17A.

The operation of this modification, as shown in FIGS. 17 and 17A, requires that the rise of the hose 489 over the dam 490 not exceed a height of 34 feet, or whatever height of water can be supported by atmospheric pressure at the particular elevation above sea level.

It will be appreciated that a pump means may be incorporated in the drainage system of any of the illustrated embodiments to provide faster drainage.

The shape of the piston members need not be limited to a generally cylindrical construction as illustrated herein. Other shapes which present less resistance to up and down movement through the water such, for example, as tear-drop or bullet-like shapes could be used.

It will be apparent that one or more of the structures described herein may be adapted to operate in a medium other than water.

It is to be understood that the embodiments shown and described are by way of example only and that many modifications can be made thereto without departing from the spirit of the invention. The invention is not to be construed as limited to the embodiments shown and described except insofar as the claims may be so limited.

I claim:

1. A hydraulic buoyant motor adapted to operate in a water medium having a surface level and a drain outlet at some level below the surface level so that a static fluid pressure head exists across the motor and comprising:
   a buoyant reciprocating piston disposed in the water medium;
   valve means for controlling the relative level of the water tending to buoy up the piston with respect to the water surface level;
   power output means operatively associated with said piston and adapted to perform work by the buoyant force and motion of said piston; and
   detention means connected to said piston and adapted to restrain the upward movement of said piston prior to commencement of its upward stroke.

2. The motor of claim 1 wherein, said piston is hollow and is adapted to be alternately filled with water and drained to perform a working cycle.

3. The motor of claim 2 wherein, said piston is formed with a vertical tubular extension mounted on the top of said piston and maintaining the interior of said piston open to atmosphere.

4. The motor of claim 3 wherein, said tubular extension also serves as a power output shaft for the motor.

5. The motor of claim 2 including, fluid inlet and outlet valve means connected to said piston and operable to fill and drain said piston.

6. The motor of claim 2 including, a combined fluid inlet and outlet valve mounted at the bottom of said piston and operable to alternately fill and drain said piston.

7. The motor of claim 5 including, valve actuating means operated automatically by the motion of said piston so as to commence filling said piston when it is at substantially the top of its stroke, and draining said piston when it is substantially at the bottom of said stroke.

8. The motor of claim 5 wherein, said valve means comprises a three way valve in communication at all times with the interior of said piston, and alternately connectible to the fluid medium and to the drain outlet.

9. The motor of claim 5 wherein, a drain line is connected between the lower portion of said piston and the drain outlet which is at a level lower than the lowermost position of fluid obtained in the piston.

10. The motor of claim 5 wherein, a drain line is connected between the lower portion of said piston and the drain outlet which is at a level lower than the lowermost position of fluid obtained in the piston, said drain line extending over a weir thus providing a syphon-like arrangement to drain water from the piston.

11. The motor of claim 2 wherein, said detention means includes a spring mechanism for restraining said piston at the bottom of its stroke with a predetermined amount of force which is slightly less than the buoyant force exerted on said piston at that point whereby the buoyant force exerted on said piston at the bottom of its stroke in empty stage will be sufficient to overcome the restraining force of the spring mechanism.

12. The motor of claim 2 wherein, said detention means includes an electrically operated mechanism for restraining the upward movement of said piston and releasing said piston at a predetermined time.

13. The motor of claim 2 wherein, said detention means includes a timed detention means for restraining said piston responsive to a predetermined or measured fill time for said piston.

14. The motor of claim 2 wherein, said detention means includes electromagnetic means for restraining said piston.

15. A hydraulic buoyant motor for operation in a water medium where a static fluid pressure head exists across the motor comprising:
   a bottomless hollow piston having a horizontal lower edge and adapted to reciprocate between two levels within the water medium;
   a fixed horizontal seal mounted beneath said piston and adapted to form a fluid tight seal with the lower edge of said piston when it is at the lower end of its stroke and inherent fluid pressure acting detention means tending to maintain said piston against said seal whenever the top of the piston is below the water's surface, and the water level within said piston is below the top of said piston.

16. The motor of claim 15 including, a remotely actuated drain valve in communication with said seal for controlling the drainage of water from the interior of said hollow piston.

17. The motor of claim 16 wherein, said hollow piston is formed with a tubular vertical extension mounted on the top of said piston and in communication with the interior of said piston for maintaining the interior of said piston in communication with atmospheric pressure.

18. The motor of claim 17 including, a remotely actuated air valve attached to said tubular extension for controlling the passage of air into and out of the interior of said piston.

19. The motor of claim 17 wherein, said detention means comprises a differential area acted upon by fluid pressure and equal to the difference between the cross-sectional area of said piston and the cross-sectional area of said tubular extension.

20. The motor of claim 19 including, additional mechanical or electrically operable detention means for restraining the upward movement of said piston.

21. A buoyant hydraulic motor for generating power by operation in a cyclical manner between two fluid pressure levels comprising:
   a fluid tight cylinder adapted to be filled with water from a reservoir;

a sealed hollow piston adapted to reciprocate vertically within said cylinder between an upper and a lower level;

automatic valve means responsive to the position of said piston to alternately fill and drain said cylinder; and piston detention means connected to said piston and operable to restrain the rise of said piston.

22. The motor of claim 21 wherein,
said valve is connected to said water reservoir and said drain level and said valve includes a plunger operated by the weight of said piston to switch said valve from a fluid draining position to a fluid filling position.

23. The motor of claim 21 wherein,
said detention means includes a pressure sensitive detention means responsive to a predetermined fluid pressure within said cylinder and operable to release said piston at said predetermined pressure.

24. A power generator unit comprising:
an electrical generator having rotatable shaft means;
a fluid medium having a surface level;
a fluid drain outlet disposed at a level below said surface level;
a buoyant reciprocating piston disposed in the fluid medium;
valve means for controlling the relative level of fluid tending to buoy up said piston with respect to the fluid surface level;
means inter-connecting said piston and said generator shaft means whereby the reciprocating movement of said piston will rotate said shaft means; and
releasable detention means operatively associated with said piston for restraining the upward movement of said piston prior to commencement of its upward stroke.

25. The power generator unit of claim 24 including,
a vertically extending power output shaft connected to the upper end of said piston, and wherein
said means inter-connecting said piston and said generator includes a rack and pinion arrangement, said rack being connected to said power output shaft.

26. A hydraulic buoyant motor adapted to operate in a water medium comprising;
a vertically reciprocating piston disposed in the water medium and adapted to reciprocate therein;
means associated with said piston for causing vertically reciprocal movement thereof in the water medium; and
detention means operatively associated with said piston for restraining said piston.

27. the hydraulic buoyant motor of claim 26 wherein,
said piston is hollow and is adapted to be filled with water; and
means associated with said piston for alternately filling said piston with water and draining the water from it, said means being operable in each cycle including a downward and upward stroke.

28. The motor of claim 27 wherein,
said means for alternately filling and draining the piston comprises valve means associated with said piston for controlling the filling and draining of said piston.

29. The motor of claim 27 wherein
said means for alternately filling and draining the piston comprises pump means associated with said piston for controlling filling and draining of said piston.

30. The motor of claim 29 wherein
the water source for filling a piston may be either the surrounding water medium or water in another associated piston.

31. The motor of claim 27 wherein,
said detention means includes a pressure sensitive detention means responsive to a predetermined fluid pressure within the said cylinder and operable to release said piston at said predetermined pressure.

32. The motor of claim 26 including:
means for releasing said detention means responsive to predetermined conditions.

33. The motor of claim 32 wherein
said detention means includes a spring mechanism for restraining said piston at the bottom of its stroke.

34. The motor of claim 32 wherein,
said detention means includes an electrically operated mechanism for restraining the upward movement of said piston and releasing said piston at a predetermined time.

35. The motor of claim 32 wherein
said detention means includes a timed detention means for restraining said piston responsive to a predetermined or measured fill time for said piston.

36. An array of hydraulic buoyant motors adapted to operate in a water medium and adapted to function together as a power producing unit comprising:
a plurality of vertically movable pistons disposed in the water medium and adapted to reciprocate therein, said pistons being hollow and adapted to be filled with water;
means associated with said pistons for causing vertically reciprocating movement thereof in the water medium, said means including
means for alternately filling said pistons with water and draining the water from them;
pump means operatively connected between at least two of said piston members whereby upon operation of said pump means water may be alternately pumped from one piston to another piston; and
detention means operatively associated with said pistons for restraining said pistons.

37. The motor of claim 1 wherein
said piston is hollow and has fluid inlet and outlet means associated therewith, said piston being adapted to be alternately filled with water and drained to perform a work cycle, and including pump means operatively associated with the outlet from said piston whereby the drainage therefrom may be accelerated.

* * * * *